May 8, 1934.   A. J. WILLIAMS, JR   1,957,925
METHOD OF AND APPARATUS FOR MEASURING FREQUENCY
Filed Sept. 30, 1931    4 Sheets-Sheet 2

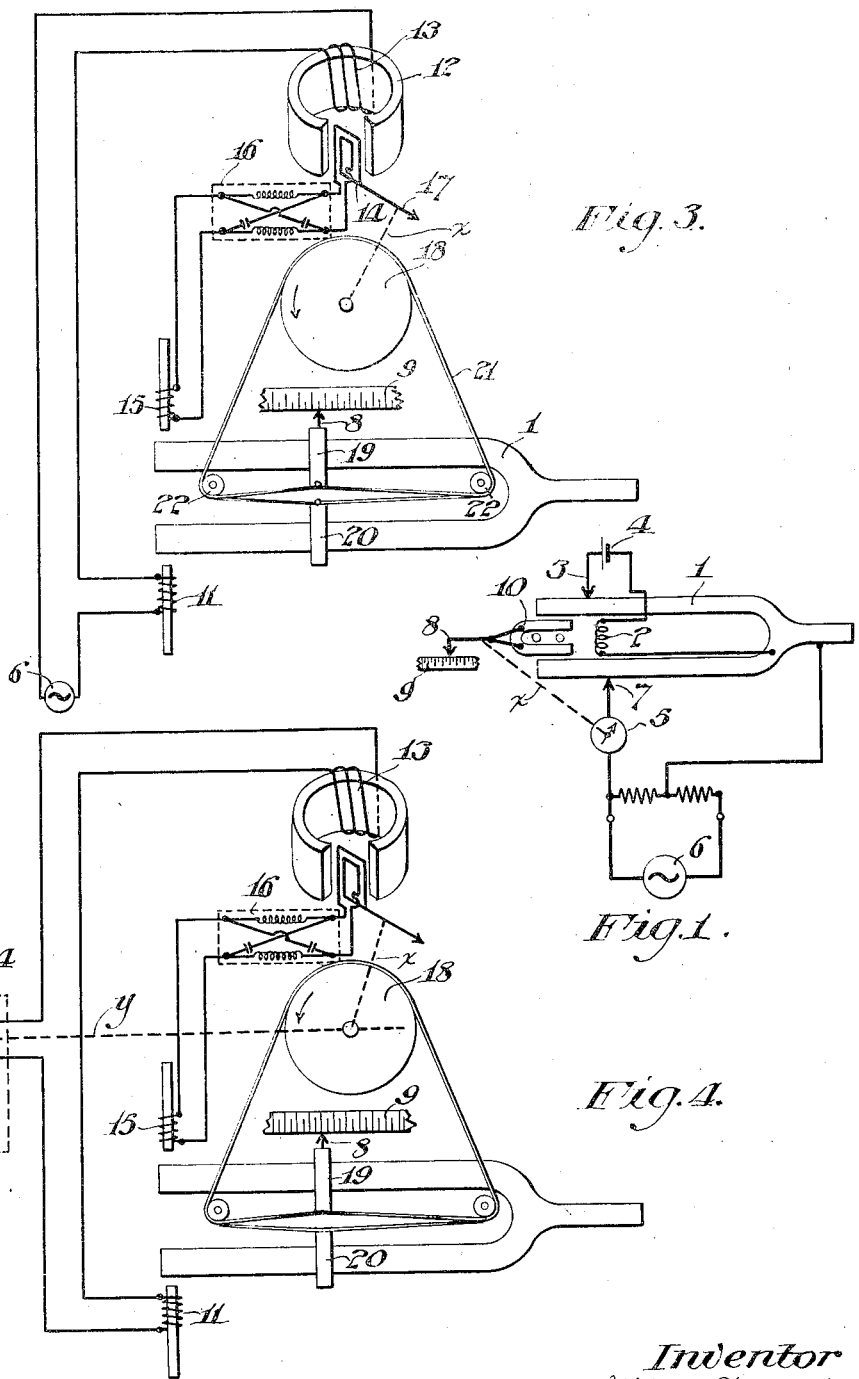

Inventor
Albert J. Williams Jr
By Cornelius D. Ehret
his Attorney.

May 8, 1934.  A. J. WILLIAMS, JR  1,957,925
METHOD OF AND APPARATUS FOR MEASURING FREQUENCY
Filed Sept. 30, 1931  4 Sheets-Sheet 3

Inventor
Albert J. Williams Jr
Cornelius D. Ehret
By his Attorney.

May 8, 1934.  A. J. WILLIAMS, JR  1,957,925
METHOD OF AND APPARATUS FOR MEASURING FREQUENCY
Filed Sept. 30, 1931  4 Sheets-Sheet 4
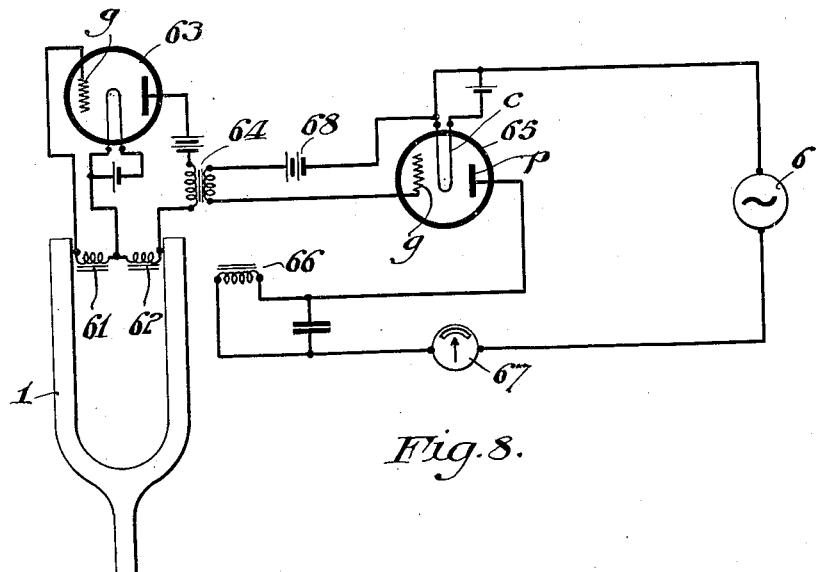
Fig. 8.
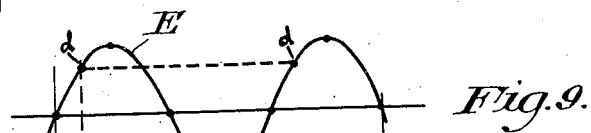
Fig. 9.
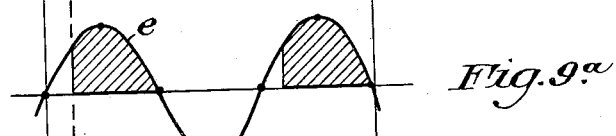
Fig. 9ᵃ.
Fig. 9ᵇ.
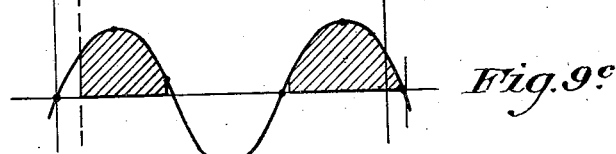
Fig. 9ᶜ.
Inventor
Albert J. Williams Jr
Cornelius D. Ehret
By his Attorney.

Patented May 8, 1934

1,957,925

UNITED STATES PATENT OFFICE 1,957,925

METHOD OF AND APPARATUS FOR MEASURING FREQUENCY

Albert J. Williams, Jr., Philadelphia, Pa., assignor to Leeds & Northrup Company, Philadelphia, Pa., a corporation of Pennsylvania Application September 30, 1931, Serial No. 566,046

19 Claims. (Cl. 172—245)

My invention relates to methods of and systems for measuring, as indicating or recording, frequency, or a condition, as speed, whose changes in magnitude effect or vary with changes in frequency.

In accordance with my invention, the frequency of a calibrated standard, for example, a vibrating mechanical system, as a tuning fork, is varied automatically until there is no difference between the frequency of the standard and the frequency under measurement; more specifically, a device responsive to the difference in phase between the standard frequency and the measured frequency varies the period of vibration of the tuning fork until the frequencies are equal and simultaneously produces an indication or record.

More particularly, and in some forms of my invention, a current whose frequency is under measurement is utilized to drive the tuning fork, or equivalent, and to supply field excitation for a galvanometer whose movable coil is supplied with current the frequency of which is determined by the period of vibration of the fork, and deflection of the galvanometer, in response to a shift in phase between the currents traversing the galvanometer field and movable coil, is utilized to vary the fork frequency, as by moving a weight, or magnet, to equality with the frequency under measurement.

In accordance with other forms of my invention, currents whose frequencies are determined by, or correspond to, the period of the fork and the frequency under measurement are impressed on the movable and stationary windings of a phase-meter, and movement of the movable structure of the meter is utilized to vary the fork frequency, preferably at a rate which increases with increase of phase-difference and vice-versa.

Further in accordance with my invention, and preferably, with adjustment of the tuning fork frequency, the phase of the current whose frequency is being measured is shifted to avoid "hunting" or overshooting of the adjustment of the period of the tuning fork.

Specifically, in accordance with another modification of my invention, a voltage varying at the tuning fork frequency is impressed on the control electrode of a thyratron, or equivalent thermionic device, whose output circuit is supplied from the source whose frequency is under measurement, and the current in the anode circuit of the thyratron is utilized to vary the tuning fork frequency and to actuate an indicating or recording instrument.

My invention also resides in the methods and apparatus hereinafter described and claimed.

For an understanding of my invention and for illustration of several of the forms which it may take, reference is to be had to the accompanying drawings in which:

Fig. 1 diagrammatically illustrates a simple system for measuring frequency.

Fig. 2 is an explanatory diagram referred to in description of the operation of the system of Fig. 1.

Fig. 3 diagrammatically illustrates a modified form of frequency measuring apparatus.

Fig. 4 is a modification of the system shown in Fig. 3 with addition of apparatus to eliminate hunting.

Fig. 5 in perspective illustrates recorder mechanism adapted to be utilized in the system of Figs. 1, 3, and 4.

Figs. 6 and 7 diagrammatically illustrate further modified forms of frequency measuring systems.

Fig. 8 is another modification utilizing a thyratron.

Figs. 9 to 9c are explanatory figures referred to in the description of operation of the system of Fig. 8.

Figures 2, 5:
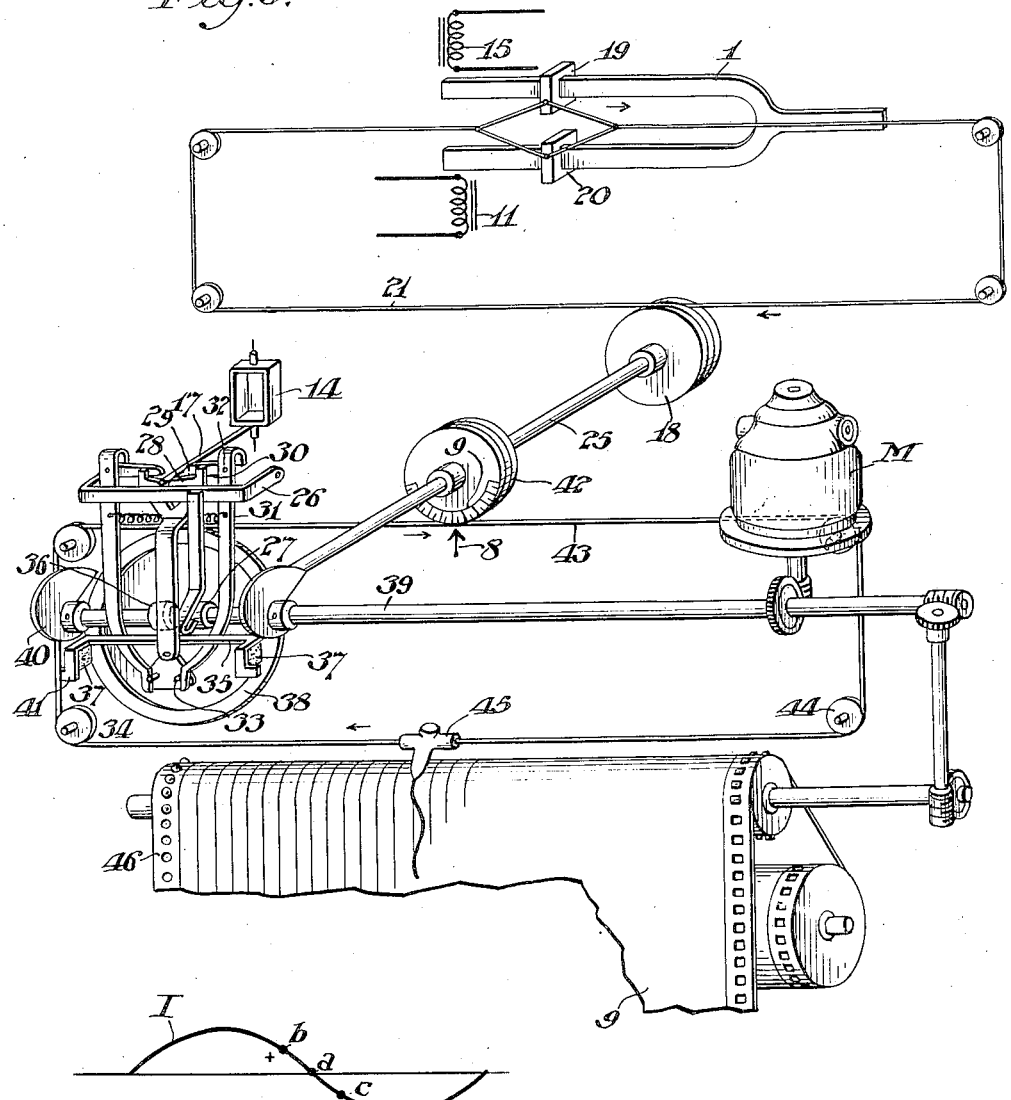

Referring to Fig. 1, vibration of tuning fork 1, which is generically illustrative of a vibrating system having a natural period of vibration, periodically makes and breaks a circuit through a driving coil 2 for the fork, by engagement with and disengagement from the fixed contact 3 which is in series with a suitable source of current as a battery 4 and the driving coil 2. By this arrangement the tuning fork is maintained continuously in vibration and at a frequency determined by the constants of the fork. The movement of the fork also makes and breaks periodically at fork frequency, a circuit which includes a deflecting instrument as a galvanometer 5 and the source of current 6, whose frequency is under measurement.

Referring to Fig. 2, the curve I represents a cycle of the voltage from the source 6. For purposes of explanation, it is assumed that the fork frequency and the frequency of the impressed current are the same and the phase relation between the two is such that the contact 7 is engaged by the fork to complete a circuit through the galvanometer 5 at a point $a$ of curve I. Under such circumstances, the galvanometer does not deflect and the pointer 8 or equivalent cooperates with scale 9 to indicate the frequency. Assuming that the frequency of the source 6 decreases for any reason, there occurs a progressive difference in phase between the waves of fork frequency, and the waves of the frequency of source 6, so that the engagement between contact 7 and the fork or a contact movable with the fork is no longer at point $a$ of the curve I but at some other point, for example, the point $b$. Consequently, current flows through the galvanometer 5 in one direction. On the other hand, if the frequency of the source 6 increases, engagement occurs between the contact 7 and fork 1, at another point $c$ of curve I, which is of opposite polarity to point $b$, so that the galvanometer 5 deflects in the opposite direction. Briefly, upon a change in frequency of the source 6, the galvanometer 5 deflects in one direction or the other depending upon the sense of change of the frequency of source 6, because of the different sense of the phase difference for the two conditions.

The movable structure of the galvanometer 5 is suitably connected to an arrangement for changing the period of vibration of the fork 1. This connection, a preferred arrangement of which is hereinafter specifically described, is generically illustrated in this figure by the dotted line $x$. In the example specifically illustrated in Fig. 1, upon deflection of galvanometer 5, the position of a permanent magnet with respect to the tines of the fork 1 is changed, and the sense of change is such that the period of vibration of the fork will be varied until the period of vibration of the fork corresponds to the new value of the frequency of source 6. That is, the fork frequency is changed in the proper sense and to such extent that the contact 7 again engages the fork when the current I is passing through the point $a$, whereupon the galvanometer no longer deflects and the fork frequency remains constant at its new value until there is further change in the frequency of source 6. Specifically, upon increase in the frequency of the source 6, the galvanometer deflects in such sense as to move the magnet 10 more or less to the left decreasing its loading effect upon the fork to cause an increase in the period of vibration of the fork. This movement of the magnet stops when the galvanometer deflection returns to and remains at zero, which occurs when the fork frequency and frequency of source 6 correspond, and are in phase with each other. Since magnet 10 assumes a different definite position for each different frequency, the position of indicator 8 which is connected to the magnet 10, with respect to the scale 9 indicates the frequency of source 6.

The speed of the fork may be changed, upon change in the frequency of source 6, in other ways; for example, instead of permanent magnet 10, there may be utilized weights slidable along the tines of the fork, as appears in modifications hereinafter described, or there may be utilized a magnet winding adjacent the tines of the fork, the strength of current through which is varied with the frequency of source 6 to change the period of the fork.

The modification of Fig. 3, is generally similar to that of Fig. 1, differing principally therefrom in that the use of make and break contacts is avoided. The driving coil 11 for the fork is, in this modification, energized from the current source 6 whose frequency is to be measured, and to effect proper phase relation of the current for the galvanometer 12, which in this modification is an alternating current instrument, the driving coil 11 is connected in series with the galvanometer field coil 13. The current for the movable coil 14 of the galvanometer is induced in the pick-up coil 15 which is disposed adjacent one of the tines of the tuning fork 1.

Between the galvanometer coil 14 and the pick-up coil 15 is interposed a suitable phase shifting device 16, so that when the frequencies of the fork 1 and the current source 6 are equal, the current in the galvanometer coil is 90° out of phase with the galvanometer field flux and there is accordingly, no deflection of the pointer 17 of the galvanometer.

When the frequency of the source 6 increases or decreases with respect to the period of the tuning fork, the phase displacement changes and causes the galvanometer needle to deflect in one direction or the other depending upon the sense of change in the frequency of source 6. By mechanism hereinafter described, and generically indicated in this figure by dotted line $x$, deflection of the galvanometer needle 17 causes the disk 18 to move in a corresponding direction to shift the position of weights 19 and 20 along the tines of the tuning fork 1. Assuming for example that the frequency of source 6 increases, the galvanometer needle 17 deflects in proper direction to effect counter-clockwise rotation of disk 18 to shift the weights 19 and 20 to the right, increasing the frequency of vibration of fork 1. In the arrangement specifically illustrated in Fig. 3, the weights are connected to disk 18 for movement therewith by a cord 21 which passes over the idler pulleys 22. The position of pointer 8 with respect to the scale 9 or equivalent, is shifted upon movement of disk 18 in counter-clockwise direction to indicate a higher magnitude of frequency.

Upon decrease in frequency, the galvanometer deflects in opposite direction to effect movement of the weights 19 and 20 to the left, decreasing the period of vibration of the fork and effecting movement of the pointer 8 to a position indicating the lower frequency. In both cases, the pointer comes to rest at zero when the fork frequency is equal to the impressed frequency and is in phase with it since under that circumstance the phase relation between the current in coil 14 and the galvanometer flux is restored to its normal value.

The two simple systems described have the disadvantage that the rebalancing of the frequencies is substantially of undamped oscillatory character and hence hunting or overshooting of the adjustment of the magnet 10, weights 19, 20, or equivalent, may occur. Hunting or overshooting is avoided with the remaining and preferred arrangements.

Referring to Fig. 4 the system is generally the same as that of Fig. 3 except that there is interposed between the source 6 and the conductors extending to driving coil 11 and galvanometer field coil 13, a suitable phase shifting device 23. As indicated, the movable coil 24 of the phase-shifter directly supplies current to the driving coil and galvanometer field and is mechanically connected, as indicated by the dotted line $y$, to the system which automatically varies the fork frequency, specifically and for example, to the disk 18. Simultaneously with adjustment of the sliding weights 19 and 20 to vary the fork frequency to correspond with the frequency of source 6, the phase of the current energizing the driving coil 11 and galvanometer coil 13 is changed with respect to the phase of the current supplied by the source 6 to the input side of the phase shifter 23. This change in phase introduces a damping factor into the rebalancing of the apparatus which precludes hunting or overshooting. In this modification as distinguished from the preceding ones, the rebalancing of the two frequencies is not directly dependent upon the phase relation between the current of source 6 and the current in the pick-up coil, since by movement of coil 24 with disk 18 the proper phase relation between the current in the fixed and movable coils of the galvanometer is attained irrespective of the phase relation between the current in the movable coil of the galvanometer and the current from the current source 6 in advance of the phase shifter 23.

In Fig. 5, there is illustrated one form of apparatus for effecting movement of the weights 19, 20 or magnet 10 of the preceding modifications, which is generally similar to the mechanism disclosed in Leeds Patent No. 1,125,699, January 10, 1915. As the galvanometer needle 17 deflects in one direction or the other, the shaft 25 is rotated in one direction or the other. For example, when the needle 17 deflects to the right, upon increase of frequency of source 6, due to periodic vertical movement of member 26 by cam 27 the needle is clamped between the inclined edge 28 and the lower edge 29 of the right hand member 30 causing the arm 31 to be tilted in a clockwise direction about its pivot 32, thereby pushing the right hand pin and plate 34 and so tilting the movable or driving arm 35 in a clockwise direction while cam 36 is holding shoes 37 from the rim of the clutch wheel 38. Soon thereafter the cam 36 which is mounted on shaft 39 driven at substantially constant speed by an electric motor M or other suitable source of power, allows the shoes 37 to re-engage the rim of clutch disk 38, and soon thereafter the left-hand cam 40 engages the ear 41, which has been elevated, pushing it downwardly to restore arm 35 to the horizontal position indicated, but in so moving back to normal position, the arm 30 through shoes 37 rotates the disk 38 and shaft 25 in counter-clockwise direction.

Secured upon the shaft 25 is the pulley or drum 18 which is connected by cord 21 to the sliding weights 19, 20. For counter-clockwise rotation of shaft 25, in response to increase of frequency of source 6, the weights 19 and 20 are moved to the right to increase the period of vibration of the fork 1. When the galvanometer needle returns to its balanced position in the gap between the ends of the members 30, the weights 19, 20 are in such position that the fork frequency corresponds to the new magnitude of frequency of source 6, and the system is again in a balanced condition.

Also secured upon the shaft 25 is the grooved pulley wheel 42, around which is wrapped the cord 43, which passes over the idler rollers 44, and has attached thereto the pen or marker 45 for drawing upon the record sheet 46 a mark of the changes of frequency. The paper 46 is driven by the motor M, as well understood in the art. Disk 42, or disk 18 may carry the frequency or speed scale 9 cooperating with the stationary pointer or index 8.

It will be readily understood that when this mechanism is utilized in the system of Fig. 1, the weights 19 and 20 are to be replaced by the magnet 10. Further when used with an arrangement such as shown in Fig. 4, the movable coil 24 of the phase shifter, is suitably mechanically connected to the control shaft 25.

Figure 6:
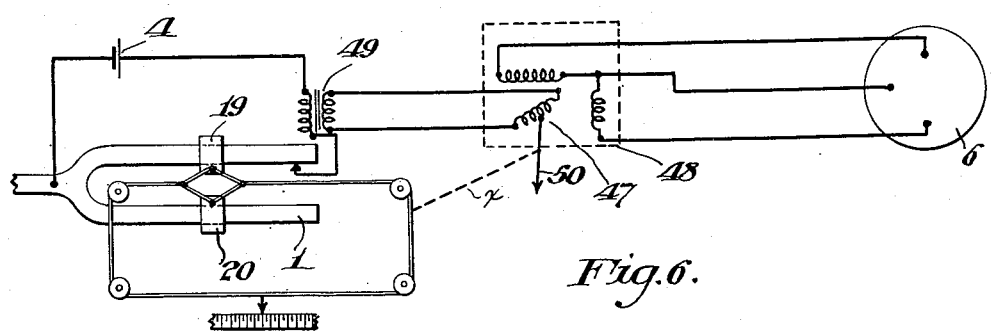

In Fig. 6, there is disclosed another arrangement characterized by absence of hunting or overshooting. In this modification of my invention, the movable coil 47 of a phase meter 48 is supplied with current whose frequency corresponds to that of the period of vibration of the fork 1. Specifically, the coil 47 is connected to the secondary of a transformer 49 whose primary is included in the driving system for the fork. The primary of the transformer may also have the function of a driving coil, as coil 2 of Fig. 1.

Upon change in the frequency of the current from the source 6, which is specifically illustrated as a three-phase current source, the movable coil 47 of the phase meter deflects in one sense or another depending upon the sense of change of frequency. The change in position of the movable coil is utilized to vary the fork frequency, as in any of the preceding arrangements. Specifically as illustrated, the pointer 50, of the phase meter directly controls the position of the sliding weights 19 and 20.

Figure 7:
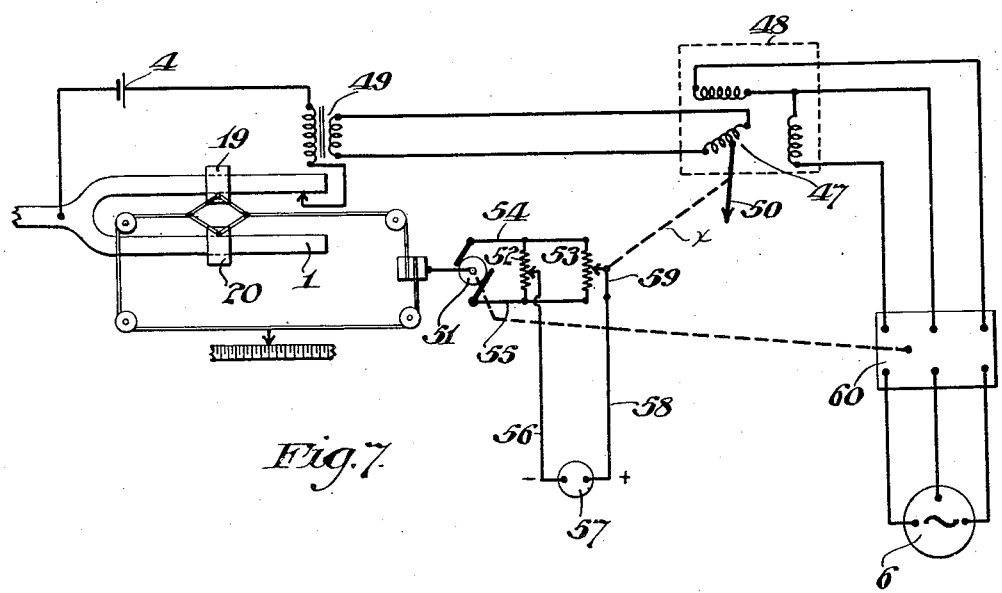

In the system shown in Fig. 7, which in many respects is generally similar to that of Fig. 6, there is shown an arrangement which does not utilize the mechanism of Fig. 5. The adjustment of the weights 19 and 20, or equivalent, and movement of the indicating pointer or recorder pen is effected by a motor 51 whose speed and direction of rotation is dependent upon the sense and extent of deflection of the member 50 associated with the movable coil 47 of the phase meter 48.

The resistances 52 and 53 are connected in shunt to each other across the conductors 54 and 55 connected to the terminals of motor 51. One of the conductors 56 from a suitable source of current supply 57 is connected to an intermediate point of resistance 52, and the other supply conductor 58 is connected to a contact 59 adjustable along resistance 53 by the deflecting member 50 of the phase meter. When the fork frequency and frequency of the source 6 are the same, the deflecting member 50 of the phase meter is in its normal position and contact 59 is to a point on resistance 53 whose potential is the same as that of the connection of conductor 56 to resistance 52. Consequently, there is no difference in potential between conductors 54 and 55 connected to the motor 51.

Upon increase in line frequency, the member 50 deflects in one direction and for a decrease in line frequency it deflects in another direction, and accordingly the adjustable contact 59 moves in opposite directions from its normal position according to the sense of change of frequency. For example, assuming that the contact 59 moves upwardly as viewed in Fig. 7, the conductor 54 becomes positive with respect to 55 and motor 51 rotates in one direction. For downward movement of contact 59, the conductor 54 becomes negative with respect to conductor 55 and the motor rotates in reverse direction. In both cases, the direction of rotation is such that the weights 19 and 20 are shifted along the fork to bring the fork frequency into correspondence with the new frequency value of source 6. Further, the greater the rate of change of frequency of source 6, the greater the extent of deflection of member 50 and the greater the displacement of contact 59. Accordingly, the potential difference between the conductors 54 and 55, and hence the speed of rotation of motor 51 and adjustment of weights 19 and 20 are functions of the rate of change of frequency of source 6.

The motor 51 also adjusts a suitable phase shifting device 60 interposed between the source of current 6 whose frequency is being measured, and the phase meter 48. Accordingly, the adjustment of weights 19 and 20 to rebalance the two frequencies does not introduce phase shift complications which tend to produce hunting. Otherwise stated, the apparatus does not have to re-establish a predetermined phase relation between the frequency of the fork and the frequency of the source 6. In fact, for every different frequency, with the apparatus in equilibrium, there is a different phase relation between the frequency of current from the supply source 6 in advance of the phase shifter 60, and the vibrations of the tuning fork.

In Fig. 8, there is shown a further modification of my invention which differs substantially in many respects from the preceding modifications. The tuning fork 1 may be driven in any suitable self-sustaining manner. For example, coils 61 and 62 disposed respectively in the input and output circuits of a vacuum tube 63, are disposed adjacent the vibrating tines of the tuning fork. The coil 61 serves as a pickup coil for impressing a pulsating or alternating voltage on the grid $g$ of the tube which controls the current flowing through the driving coil 62 for the fork. However, any suitable system may be used for driving the fork, such as for example that described in connection with Fig. 6. The secondary of a transformer 64 whose primary is traversed by the anode current of tube 63 is connected to the input electrodes $c$, $g$ of a thyratron 65 or equivalent device. The source of current 6 whose frequency is to be measured, is connected to the output electrodes $c$, $p$, the cathode and plate respectively, of the thyratron. In series in the anode circuit of the thyratron is included a coil 66 disposed adjacent a tine of the fork 1, and a current indicating instrument 67.

It is characteristic of a thyratron that when the voltage of the grid or control electrode assumes a proper value to start flow of plate current, that the control action of the electrode is lost and the plate current continues to flow without effect by the grid voltage until the plate current is interrupted or reduced to some small value.

Referring to Fig. 9, the curve E represents the voltage impressed on the grid $g$ whose frequency corresponds to that of the period of vibration of fork 1. The biasing battery 68 is adjacent or adjusted to determine the point in the cycle when the voltage of grid $g$ is sufficient to initiate flow of plate current. For example, the voltage of battery 68 may be adjusted so that at the point $d$, Fig. 9, between each positive wave, the grid voltage is sufficient to initiate plate current.

Assuming that the frequency of source 6 corresponds to that of the fork, see curve $e$, Fig. 9a, the grid $g$ will attain its critical value $d$ at corresponding points of successive positive current impulses of the current from source 6. Accordingly, the average current flowing through the indicating instrument 67 maintains a predetermined constant value as indicated by the equality of the shaded areas of the positive impulses, Fig. 9a.

As previously explained, the flow of anode current ceases upon reversal in polarity and does not flow again until the grid voltage again attains its critical value. Assuming that the line frequency increases, see Fig. 9b, the point in successive cycles of curve $e$ at the grid assumes its critical value becomes later, so that the average current in the plate circuit of the thyratron becomes less, as indicated by the decreasing shaded areas of the successive positive impulses. Accordingly, the indicating instrument deflects in one direction from its normal position. Furthermore, the current flowing through coil 66 decreases reducing the biasing force exerted thereby on the fork 1, permitting it to vibrate at a higher frequency. The change in fork frequency causes a change in frequency of the voltage impressed upon the input electrodes of the thyratron and the system again comes in balance for a new frequency of vibration of fork 1 which corresponds to the changed value of line frequency, and the indicating or recording instrument 67 indicates or records a higher frequency corresponding to the decreased current.

Conversely, when the line frequency decreases, the average plate current of the thyratron increases, see Fig. 9c, which increases the biasing force exerted by coil 66 of a fork 1 and so reduces its velocity until a balance is reestablished. The higher value of plate current causes the instrument 67 to deflect in the opposite direction to indicate a lower frequency.

The several arrangements described may be utilized to indicate or record the frequency of an alternating current power line supplying current to motors, lights, etc., in which case the scale 9, or recorder sheet 46 may be calibrated in units of frequency. However, the source of current 6 may be a small alternator driven by a mechanical device, as a motor, engine, pump, or the like whose speed it is desired to measure, in which event the scale 9, or recorder sheet may be calibrated in units of speed, as revolutions per minute.

It is characteristic of all the systems herein described, that small changes of frequency can be measured and an indication or record made, and further that the responses to the changes in frequency are practically instantaneous since any tendency for the frequency to change causes a phase difference which at once changes the frequency of the calibrated standard, specifically a tuning fork, to indicate the trend.

While I have specifically illustrated and described several modifications of my invention, it is to be understood that other and further modifications may be made without departing from the spirit and scope of the invention as expressed by the appended claims.

What I claim is:

1. A system for continuously measuring the instantaneous frequency of a variable periodic effect comprising means for producing a periodic effect of known frequency, means for changing the frequency of said second periodic effect to known values without effect upon said variable periodic effect, and means responsive to change of the phase angle between said periodic effects for controlling said frequency changing means.

2. A system for continuously measuring the instantaneous frequency of a variable periodic effect comprising a vibrating member, means for changing the period of vibration of said member to known values without effect upon said variable periodic effect, and means responsive to change of the phase angle between the said periodic effect and the displacement of said member for controlling said frequency changing means.

3. A system for continuously measuring the instantaneous frequency of a variable periodic effect comprising a vibrating member, structure indicating the frequency of vibration of said member, means adjustable to change the period of vibration of said member without effect upon said variable periodic effect, and means responsive to change of the phase angle between said periodic effect and the displacement of said member for controlling said adjustable means.

4. A system for continuously measuring the instantaneous frequency of a variable periodic effect comprising a vibrating member, indicating structure, means adjustable to change the period of vibration of said member and the position of said structure without effect upon said variable periodic effect, and means responsive to change of the phase angle between said periodic effect and the displacement of said member for controlling said adjustable means.

5. A system for continuously measuring the instantaneous frequency of an alternating current comprising a vibrating member, means responsive to change of the phase angle between the alternating current and the displacement of said member, and means for varying the period of vibration of said member controlled by said responsive means without effect upon the frequency of said current.

6. A system for continuously measuring the instantaneous frequency of an alternating current comprising a vibrating member, indicating structure, means responsive to change of the phase angle between the alternating current and the displacement of said member, and means controlled by said responsive means to vary the period of vibration of said member and the position of said structure without effect upon the frequency of said current.

7. A system for measuring the frequency of an alternating current comprising a vibrating member, means associated therewith for producing a current whose frequency is determined by the period of vibration of said member, means for changing the period of vibration of said member, and an instrument having fixed and movable coils energized by said currents and a deflecting member for controlling said period changing means to maintain a predetermined phase relation between said currents.

8. A system for continuously measuring the instantaneous frequency of a periodic effect comprising a vibrating member, means for changing the period of vibration of said member to known values without effect upon said periodic effect, means responsive to change of the phase angle between said periodic effect and the displacement of said member for actuating said period changing means in accordance with the shift in phase, and means responsive to said first responsive means for controlling the phase of said periodic effect.

9. A system for measuring the frequency of an alternating current source comprising a vibrating member, means for driving said member energized from said source, a deflection instrument having fixed and movable coils, one of which is energized from said source, a phase-shifting device interposed between said source and a current path including said driving means and said one of said coils, means associated with said member for producing a current for energizing the other of said coils, and means controlled by said instrument for actuating said phase-shifting device and simultaneously varying the period of vibration of said member.

10. A system for measuring the frequency of an alternating current comprising means for producing a second alternating current, calibrated means for changing the frequency of current produced by said first means without effect upon the frequency of said first alternating current, and means responsive to changes in the phase relation between said currents controlling said calibrated frequency changing means.

11. A system for measuring the frequency of a periodic effect comprising means for producing a second periodic effect, calibrated means for changing the frequency of said second periodic effect only, and means responsive to changes in the phase relation between said effects for controlling said calibrated frequency changing means.

12. A system for measuring the frequency of an alternating current comprising means for producing a second alternating current, calibrated means for changing the frequency of said second alternating current only, and a phase-meter having fixed and movable coils energized by said currents and controlling said calibrated frequency changing means.

13. A system for measuring the frequency of an alternating current comprising means for producing a second alternating current, calibrated means for changing the frequency of said second alternating current only, actuating means for said frequency changing means including movable structure, and means responsive to phase difference of said currents controlling said actuating means to effect movement of said structure at a rate dependent upon the magnitude of the phase difference.

14. A system for measuring the frequency of an alternating current comprising means for producing a second alternating current, calibrated means for changing the frequency of said second alternating current only, actuating means for said frequency changing means including a motor, and means responsive to phase difference of said currents controlling the direction and speed of rotation of said motor.

15. A system for measuring the frequency of an alternating current comprising means for producing a second alternating current, calibrated means for changing the frequency of said second alternating current only, actuating means for said frequency changing means including a motor, means responsive to phase difference of said currents controlling the direction and speed of rotation of said motor, and a phase-shifting device interposed between said phase-difference responsive device and the source of said first alternating current including movable structure actuated by said motor.

16. A system for measuring the frequency of an alternating current comprising means for generating a second alternating current, a thyratron, means for impressing on the input electrodes of said thyratron a voltage whose frequency corresponds to that of said second alternating current, means for impressing on the output electrodes of said thyratron a voltage whose frequency corresponds to that of said first alternating current, and means varying the frequency of said second alternating current in accordance with the magnitude of current in the output system of said thyratron.

17. A system for measuring the frequency of an alternating current comprising a vibrating member, a thyratron, means for impressing on the input electrodes of said thyratron a voltage whose frequency is determined by the period of vibration of said members, means for impressing on the output electrodes of said thyratron a voltage whose frequency corresponds to that of said alternating current, and means for varying the period of vibration of said member in response to changes in magnitude of current in the output system of said thyratron.

18. A system for measuring the frequency of an alternating current comprising a vibrating member, a thyratron, means for impressing on the input electrodes, of said thyratron a voltage whose frequency is determined by the period of vibration of said members, means for impressing on the output electrodes of said thyratron a voltage whose frequency corresponds to that of said alternating current, means for varying the period of vibration of said member in response to changes in magnitude of current in the output system of said thyratron, and means calibrated in units of frequency in the output system of said thyratron.

19. A system for measuring the frequency of a periodic effect comprising a vibrating member, means for rapidly changing the period of said vibrating member to known values without effect upon the frequency of said periodic effect, and means for controlling said period changing means sensitive to small phase difference between said periodic effect and the displacement of said vibrating member.

ALBERT J. WILLIAMS, Jr.